United States Patent
Lai (10) Patent No.: US 7,916,228 B2
(45) Date of Patent: Mar. 29, 2011

(54) METHOD FOR REPAIRING THIN FILM TRANSISTOR ARRAY BY WELDING A TOP ELECTRODE TO A COMMON LINE

(75) Inventor: Han-Chung Lai, Taoyuan Hsien (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/647,524

(22) Filed: Dec. 27, 2009

(65) Prior Publication Data
US 2010/0099204 A1    Apr. 22, 2010

Related U.S. Application Data

(62) Division of application No. 10/907,002, filed on Mar. 16, 2005, now Pat. No. 7,675,581.

(30) Foreign Application Priority Data

Nov. 11, 2004 (TW) ................................ 93134409 A (51) Int. Cl.
*G02F 1/1343* (2006.01)
*G02F 1/13* (2006.01)

(52) U.S. Cl. ............................ 349/39; 349/55; 349/192

(58) Field of Classification Search ................... 349/54, 349/55, 192
See application file for complete search history.

(56) References Cited

U.S. PATENT DOCUMENTS

| | | | | | |
|---|---|---|---|---|---|
| 5,392,143 | A | * | 2/1995 | Akiyama et al. | 349/55 |
| 5,648,826 | A | * | 7/1997 | Song et al. | 349/42 |
| 5,734,450 | A | * | 3/1998 | Irie et al. | 349/39 |
| 6,822,701 | B1 | * | 11/2004 | Kasahara et al. | 349/38 |
| 6,839,099 | B2 | * | 1/2005 | Fukunishi | 349/54 |
| 7,221,413 | B2 | * | 5/2007 | Lai | 349/38 |

* cited by examiner

*Primary Examiner* — Mark A Robinson
*Assistant Examiner* — Paul C Lee
(74) *Attorney, Agent, or Firm* — Jianq Chyun IP Office (57) ABSTRACT

A thin film transistor array comprising a substrate, a plurality of scan lines, a plurality of data lines, a plurality of thin film transistors, a plurality of common lines, a plurality of top electrodes, a plurality of connection lines and a plurality of pixel electrodes is provided. Wherein, each thin film transistor is disposed in one of the pixel areas and driven through the corresponding scan line and data line. Each thin film transistor includes a gate, a source and a drain. The drain of the thin film transistor is electrically connected to the corresponding top electrode by the corresponding connection line. Besides, the drain of the thin film transistor is electrically connected to the pixel electrode, and a portion of the connection line is not covered by the pixel electrode.

2 Claims, 8 Drawing Sheets

METHOD FOR REPAIRING THIN FILM TRANSISTOR ARRAY BY WELDING A TOP ELECTRODE TO A COMMON LINE

CROSS-REFERENCE TO RELATED APPLICATION

This is a divisional application of and claims the priority benefit of patent application Ser. No. 10/907,002, filed on Mar. 16, 2005, which claims the priority benefit of Taiwan application serial no. 93134409, filed on Nov. 11, 2004 and is now allowed. The entirety of each of the above-mentioned patent applications is hereby incorporated by reference herein and made a part of this specification.

BACKGROUND OF THE INVENTION

1. Field of the Invention

The present invention relates to a pixel structure, a thin film transistor array, and a repairing method therefor, and more particularly to a pixel structure with a storage capacitor Cst which is adapted to be repaired, a thin film array transistor, and a repairing method therefor.

2. Description of the Related Art

Due to the advance of the semiconductor devices and display apparatuses, multimedia technology has dramatically improved. For display devices, having outstanding quality and economic advantages, Cathode Ray Tube (CRT) has dominated the display market. In the concerns of limited space required by desktop terminal/display apparatus and the environmental protection for power saving, CRT still has some issues regarding space and power consumption that should be resolved. Thus, CRT cannot meet the requirements of being slim, light and small, and power saving. Accordingly, high-resolution, effective space utilization, low-power consumption, and non-radiation Thin Film Transistor Liquid Crystal Display (TFT-LCD) has gradually become the main trend in the market.

Thin Film Transistor Liquid Crystal Display (TFT-LCD) is mainly composed of a thin film transistor array substrate, a color filter array substrate and a liquid crystal layer. Wherein, the thin film array transistor substrate is composed of transistors arranged in array and pixel electrodes corresponding thereto. The thin film transistors serve as switch devices for the liquid crystal display units. In addition, scan lines and data lines control pixels to identify the selected pixel. By applying suitable operation voltage, the data corresponding to the pixel can be displayed. In addition, generally a portion of the pixel electrode covers over the scan lines or common lines to form storage capacitors. In the prior art technology, the general storage capacitor structure has two different types: a first metal layer/insulator/a second metal (MIM) structure and a first metal layer/insulator/Metal-Insulator-ITO (MII) structure. Following are descriptions for these storage capacitors.

Figure 1:
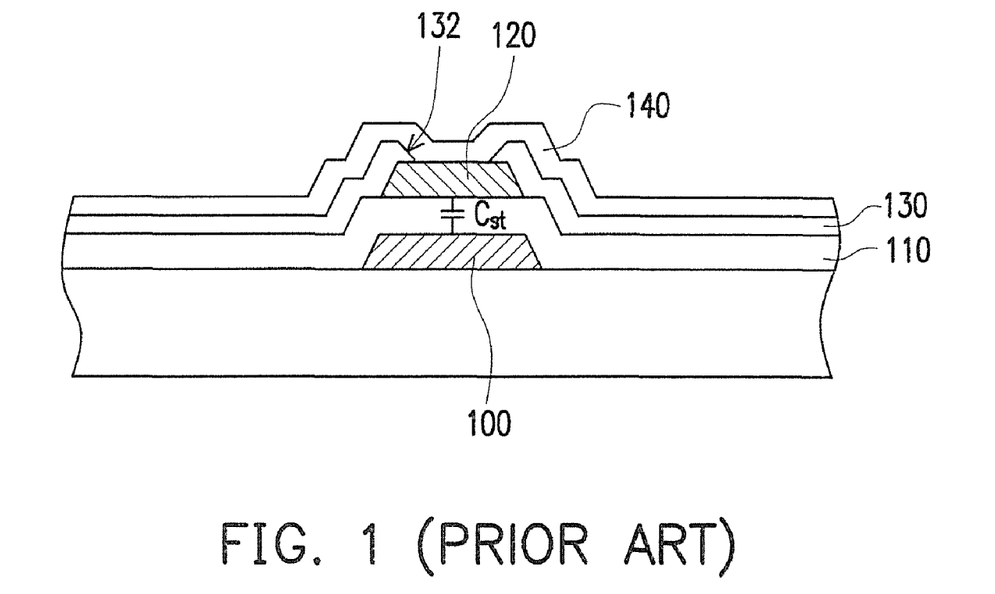
FIG. 1 is a cross sectional view showing a prior art MIM storage capacitor.

FIG. 1 is a cross sectional view showing a prior art MIM storage capacitor. Referring to FIG. 1, the MIM storage capacitor is composed of a scan line or a common line 100, a top electrode 120 thereon. Note that in the MIM storage capacitor, the scan line or the common line 100 is isolated from the top electrode 120 by a gate insulation layer 110. The capacitance Cst of the storage capacitor is related to the thickness of the gate insulation layer 110. In other words, the thinner the gate insulation layer 110, the larger the capacitance Cst of the storage capacitor. In addition, a pixel electrode 140 is electrically connected to the top electrode 120 through a contact window 132 within a protection layer 130.

Figure 2:
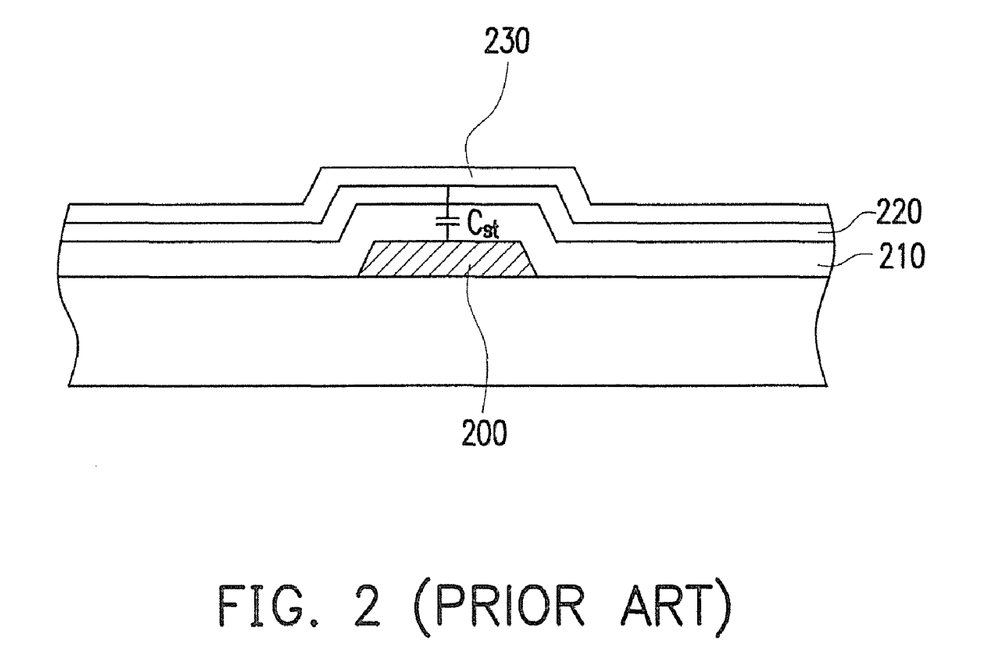
FIG. 2 is a cross sectional view showing a prior art MII storage capacitor.

FIG. 2 is a cross sectional view showing a prior art MII storage capacitor. Referring to FIG. 2, the MII storage capacitor is composed of a scan line or a common line 200 and a pixel electrode 230 thereon. Different from the structure of an MIM storage capacitor, in the MII storage capacitor, the scan line or the common line 200 is isolated from the pixel electrode 230 by a gate insulation layer 210 and a protection layer 220. The capacitance Cst of the storage capacitor is related to the total thickness of the gate insulation layer 210 and the protection layer 220. In other words, the thinner the total thickness of the gate insulation layer 210 and the protection layer 220, the larger the capacitance Cst of the storage capacitor.

As described, generally the capacitance Cst of an MIM storage capacitor is larger than the capacitance Cst of an MII storage capacitor. The reason is that only a gate insulation layer 110 is used in the MIM storage capacitor while a gate insulation layer 210 and a protection layer 220 are used in the MII storage capacitor.

With the storage capacitor in the pixel structure, the pixel unit of the TFT-LCD can maintain and store data. It means that the larger the capacitance Cst of the storage capacitor, the better function of storing and maintaining data by the pixel unit. Accordingly, in the prior art, the MIM storage capacitor was generally used as storage capacitor in TFT-LCD.

Though the MIM storage capacitor has larger capacitance, defects, such as particles or holes, are easily generated during the process of manufacturing the MIM storage capacitor. Accordingly, bright/dark spots will be generated and resulted in failure of the storage capacitor.

SUMMARY OF THE INVENTION

Accordingly, the present invention is directed to a thin film transistor array. When charge leakage resulted from particles or defects occur in the storage capacitors of the thin film transistor array, the present invention can effectively repair the storage capacitors in the pixels.

The present invention is also directed to a repairing method for a thin film transistor array, which can effectively repair the storage capacitors in the pixels.

Another object of the present invention is to provide a pixel structure which is adapted for the repairing method for the storage capacitors.

In order to achieve the objects described above or other objects, the present invention provides a thin film transistor array. The thin film transistor array comprises a substrate, a plurality of scan lines, a plurality of data lines, a plurality of thin film transistors, a plurality of common lines, a plurality of top electrodes, a plurality of connection lines, and a plurality of pixel electrodes. Wherein, the scan lines and data lines are disposed over the substrate to divide the substrate into a plurality of pixel areas. The thin film transistors are disposed in the pixel areas. The thin film transistors are driven through the scan lines and the data lines. Each of the thin film transistors comprises a gate, a source and a drain. The common lines are disposed over the substrate. Each of the common lines is disposed between two adjacent scan lines. Each of the top electrodes is disposed in one of the pixel areas, and each of the top electrodes is disposed over one of the common lines. One of the top electrodes and one of the common lines constitute a storage capacitor. The drain of each of the thin film transistors connects with one of the top electrodes through one of the connection lines. Each of the pixel electrodes is disposed in one of the pixel areas. Each of the pixel electrodes is disposed over one of the top electrodes and over one of the connection lines. The drain of each of the thin film transistors is electrically connected to one of the pixel electrodes, and a portion of each of the connection lines is not covered by the pixel electrode.

According to a preferred embodiment of the present invention, the thin film transistor array further comprises, for example, a gate insulation layer over the substrate to substantially cover the scan lines.

According to a preferred embodiment of the present invention, the thin film transistor array further comprises, for example, a protection layer disposed over the substrate to substantially cover the scan lines, the data lines, the thin film transistors, the common lines, the top electrodes, and the connection lines.

According to a preferred embodiment of the present invention, the pixel electrodes is comprised of, for example, indium-tin-oxide or indium-zinc-oxide.

According to a preferred embodiment of the present invention, each of the common lines comprises, for example, at least one first branch structure. Each of the top electrodes comprises, for example, at least one second branch structure. Each of the second branch structures is covering each of the first branch structures correspondingly.

According to a preferred embodiment of the present invention, each of the common lines divides one of the pixel areas into a first area and a second area. In a preferred embodiment of the present invention, the first area and the second area are in the same size. In another preferred embodiment of the present invention, the first area is smaller than the second area. In addition, the described connection line is disposed in the smaller sized first area to enhance the aperture ratio.

According to a preferred embodiment of the present invention, each of the top electrodes and one of the common lines have an overlapping area; the overlapping area comprises a repair area which is not covered by the pixel electrode.

In order to achieve the objects described above and other objects, the present invention provides a method for repairing a thin film transistor array. At first, locating the pixel area having the storage capacitor to be repaired, and cutting the connection line not covered by the pixel electrode in the corresponding pixel area, corresponding to one of the storage capacitors in which charge leakage occurs. Accordingly, the metal/insulator/metal (MIM) structure is transformed into the metal/insulator/indium-tin-oxide or indium-zinc-oxide (MII) structure.

In order to achieve the objects described above and other objects, the present invention provides a method for repairing a thin film transistor array. At first, locating the pixel area having the storage capacitor to be repaired, and cutting the connection line not covered by the pixel electrode in the corresponding pixel area. Then, the top electrode and the common line in a corresponding repair area are welded.

The present invention provides a thin film transistor array and a repairing method therefor. When the charge leakage occurs resulting from particles or defects in the MIM storage capacitor, the repairing method of the present invention transforms the MIM storage capacitor into the MII storage capacitor.

The present invention provides a pixel structure with a storage capacitor. The pixel structure comprises a thin film transistor, a pixel electrode, a common line, a top electrode, and a connection line. Wherein, the thin film transistor comprises a gate, a source, and a drain. The pixel electrode is electrically connected to the drain of the thin film transistor. The common line is disposed under the pixel electrode. The top electrode is disposed between the common line and the pixel electrode. The top electrode and the common line constitute a storage capacitor. The connection line is electrically connected between the drain of the thin film transistor and the top electrode, and a portion of the connection line is not covered by the pixel electrode.

According to a preferred embodiment of the present invention, in the pixel structure with the storage capacitor, the pixel electrode is comprised of indium-tin-oxide or indium-zinc-oxide.

According to a preferred embodiment of the present invention, in the pixel structure with the storage capacitor, the top electrode and the common line have an overlapping area, the overlapping area comprises a repair area, and the pixel electrode does not cover the repair area.

The above and other features of the present invention will be better understood from the following detailed description of the preferred embodiments of the invention that is provided in communication with the accompanying drawings.

DESCRIPTION OF SOME EMBODIMENTS

Figure 3A:
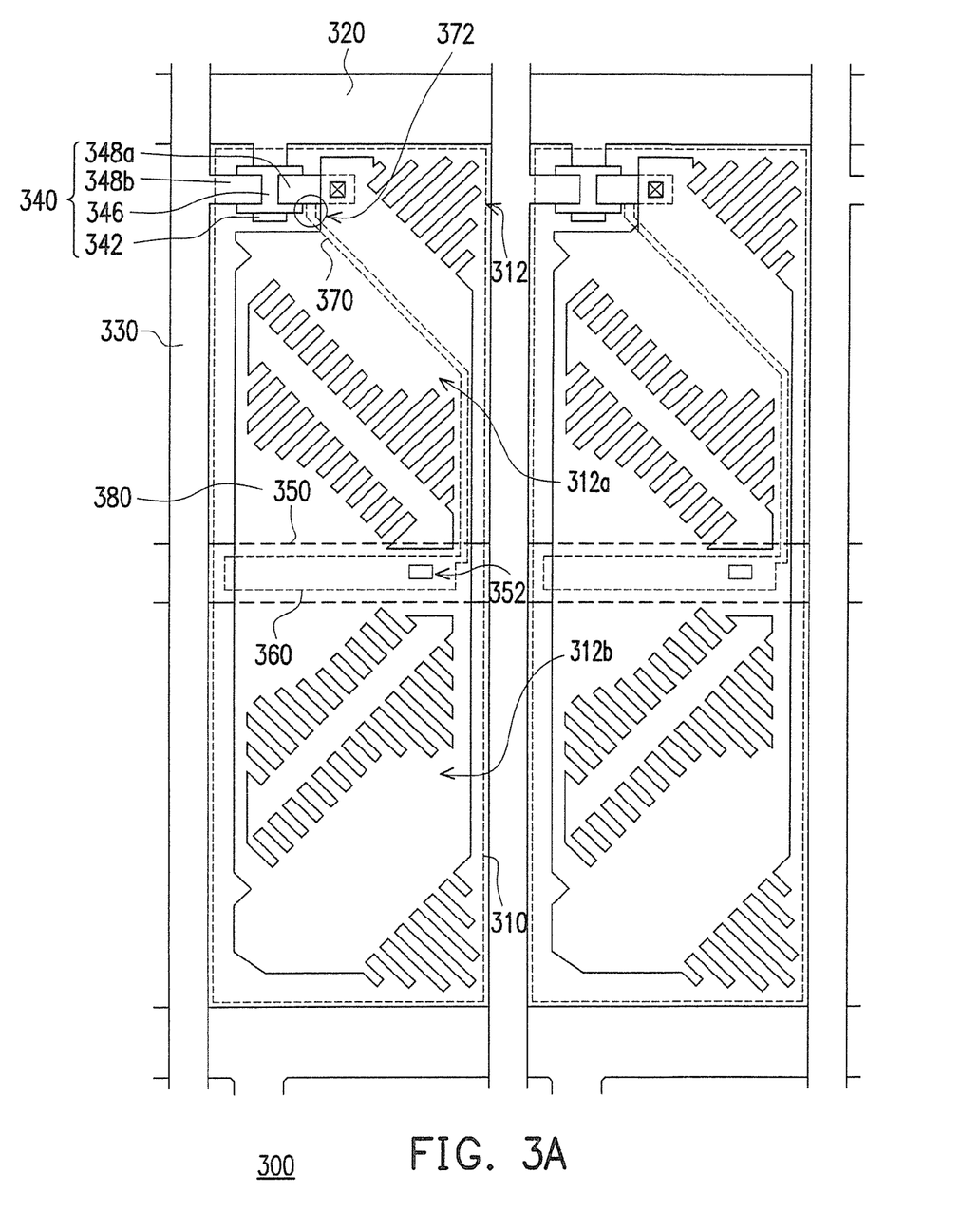
FIG. 3A is a top view showing a thin film transistor array substrate according to an embodiment of the present invention.

FIG. 3A is a top view showing a thin film transistor array substrate according to an embodiment of the present invention. Referring to FIG. 3A, the thin film transistor array substrate 300 of the present invention comprises a substrate 310, a plurality of scan lines 320, a plurality of data lines 330, a plurality of thin film transistors 340, a plurality of common lines 350, a plurality of top electrodes 360, and a plurality of connection lines 370.

In this embodiment, the substrate 310 can be, for example, a glass substrate, a plastic substrate, or a substrate with other materials. As shown in FIG. 3A, the scan lines 320 and data lines 330 are disposed over the substrate 310, and divide the substrate 310 into a plurality of pixel areas 312. In detail, the scan lines 320 are parallel disposed over the substrate 310, for example. The data lines 330 are also parallel disposed over the substrate 310. The extending direction of the scan lines 320 and the data lines 330 is for example cross to each other to divide the substrate 310 into plural quadrangular pixel areas 312, for example.

As shown in FIG. 3A, the thin film transistor 340 is disposed in the corresponding pixel area 312. The thin film transistor 340 is driven through the scan line 320 and the data line 330. In detail, the thin film transistor 340 is near the intersection of the scan line 320 and the data line 330 corresponding thereto. It means that the thin film transistor 340 is disposed at a corner of the pixel area 312.

Figure 4:
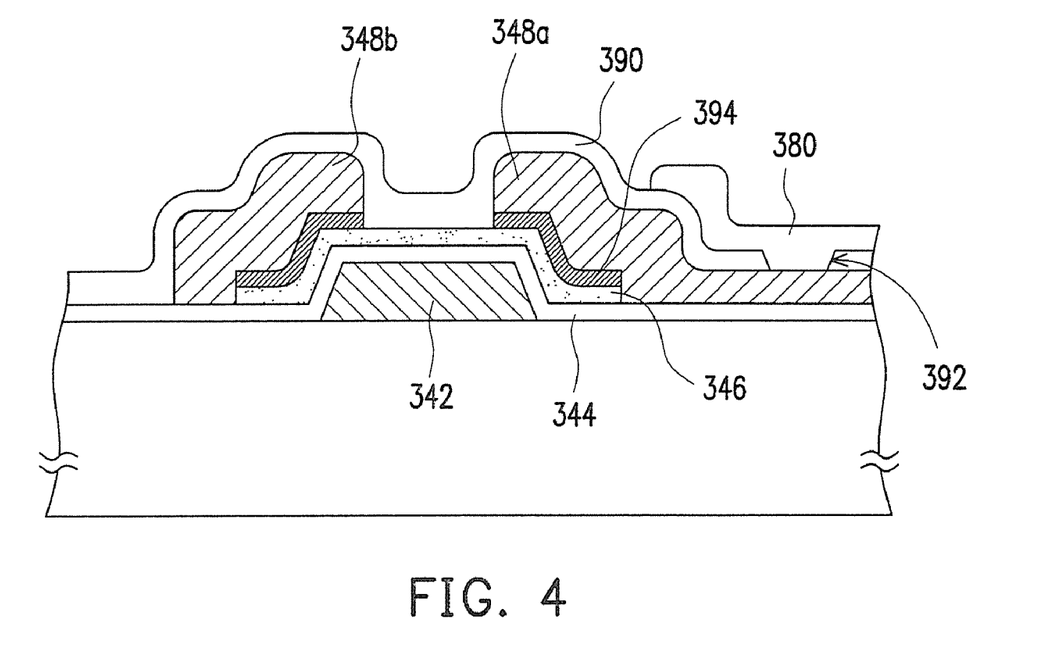
FIG. 4 is a cross sectional view showing a thin film transistor according to an embodiment of the present invention.

FIG. 4 is a cross sectional view showing a thin film transistor according to an embodiment of the present invention. Referring to FIGS. 3A and 4, the thin film transistor 340 comprises, for example, a gate 342, a gate insulation layer 344, a semiconductor material layer 346, an ohmic contact layer 394, a source 348b, a drain 348a, and a protection layer 390. Wherein, the material of the gate 342 can be, for example, aluminum or other metal. The material of the gate insulation layer 344 can be, for example, silicon nitride, silicon oxide, or other dielectric material. The gate insulation layer 344 is disposed over the gate 342. The material of the semiconductor material layer 346 can be amorphous silicon, for example, and disposed over the gate insulation layer 344. The material of the source 348b and the drain 348a can be, for example, a Mo/Al/Mo composite metal material, a suitable single conductive material, or other suitable composite material. The source 348b and the drain 348a are disposed over a portion of the semiconductor material layer 346 and a portion of the gate insulation layer 344. The drain 348a is electrically connected to the pixel electrode 380 through a contact window 392, which is within the protection layer 390. The material of the protection layer 390 can be, for example, silicon nitride, silicon oxide or other suitable dielectric materials. The protection layer 390 covers the source 348b, the drain 348a, the scan line 320, the data line 330, the common line 350, the top electrode 360, and the connection line 370. In addition, the gate 342 and the scan line 320 can be formed in a same process, for example. The source 348b and the drain 348a may be formed in a same process with the data line 330.

Referring to FIG. 3A, the common lines 350 are disposed over the substrate 310. The common line 350 is disposed between the adjacent scan lines 320, serving as the first metal layer of the MIM storage capacitor. In this embodiment, the material of the common line 350 can be, for example, aluminum or other metal materials. In addition, the common line 350 divides the pixel area into a first area 312a and a second area 312b. The sizes of the first area 312a and the second area 312b are determined by the disposition of the common line 350. In this embodiment, the first area 312a can be larger, smaller, or equal to the second area 312b.

Figure 3B:
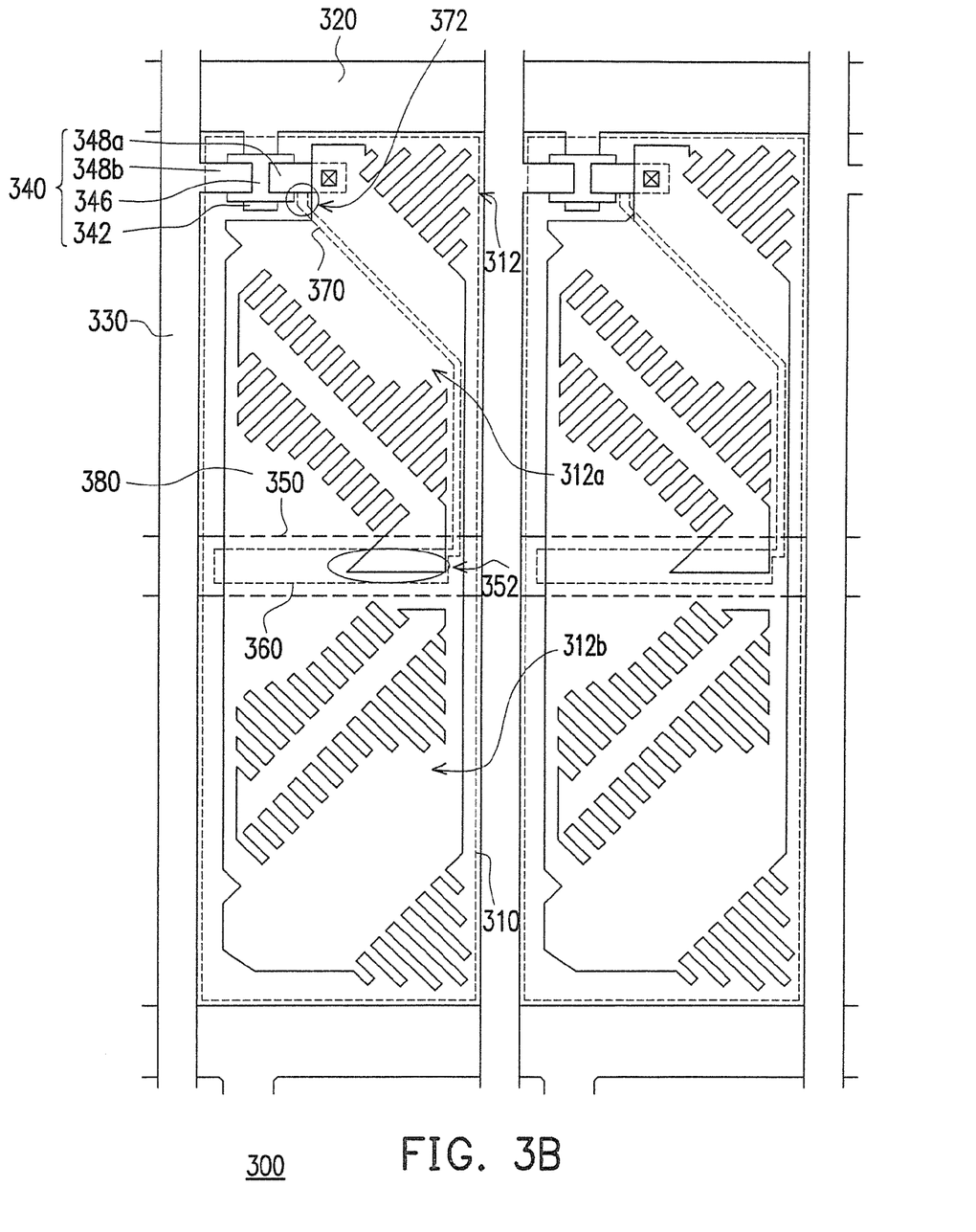
FIG. 3B is a top view showing another thin film transistor array substrate according to an embodiment of the present invention.

Referring to FIG. 3A, the top electrode 360 is disposed in the pixel area 312. The top electrode 360 is disposed over the common line 350, serving as the second metal layer of the MIM storage capacitor. In other words, the top electrode 360 and the common line 350 constitute a storage capacitor. In this embodiment, the overlapping area of the top electrode 360 and the common line 350 further comprises a repair area 352, which is not covered by a pixel electrode 380. The repair area 352 can be, for example, an opening of the pixel electrode 360 as shown in FIG. 3A or a slit of the pixel electrode 360 as shown in FIG. 3B.

Referring to FIG. 3A, the connection line 370 connects the drain 348a of the thin film transistor 340 with the top electrode 360. The connection line 370 usually is disposed at a disclination area in which light is less penetrated. In the embodiment of a Multi-domain Vertical Aligned Liquid Crystal Display (MVA-LCD), the pixel area 312 often generates disclination areas due to design of protrusions and/or slits. In this embodiment, the connection lines 370 are disposed over the disclination area. The material of the connection lines 370 can be, for example, aluminum or other metal. The connection lines 370 can be the same metal material of the top electrodes 360 or be formed with the top electrodes 360 by the same process.

Figure 5:
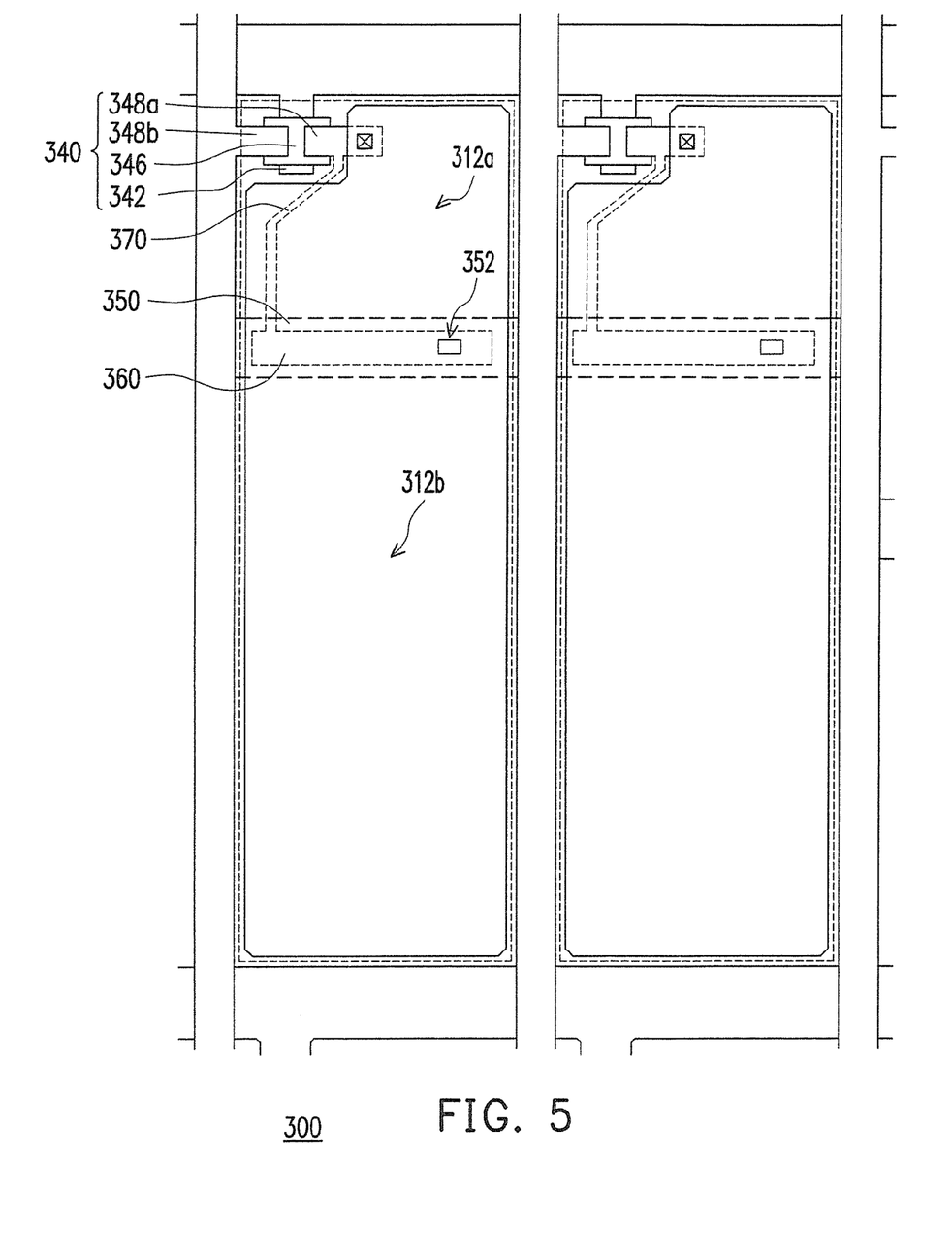
FIG. 5 is a top view showing a thin film transistor array substrate according to another preferred embodiment of the present invention.

FIG. 5 is a top view showing a thin film transistor array substrate according to another preferred embodiment of the present invention. Referring to FIG. 5, the connection line 370 is disposed in the first area 312a of the pixel area 312. Accordingly, the length of the connection line 370 depends on the location of the common line 350. In other words, the closer the common line 350 to the corresponding thin film transistor 340, the shorter the connection line 370. The connection line 370 can be, for example, disposed in the smaller sized first area 312a to increase the aperture ratio.

Referring to FIG. 3A, the pixel electrode 380 is disposed in the pixel area 312, and is over the top electrode 360 and the connection line 370. A partial area 372 of the connection line 370 is not covered by the pixel electrode 380. The pixel electrode 380 can be comprised of, for example, indium-tin-oxide, indium-zinc-oxide, or other conductive materials. Wherein, in the prior art technology, the pixel electrode 140 is electrically connected to the top electrode 120 through the contact window 132 which is within the protection layer 130. In the present invention, the pixel electrode 380 is electrically connected to the top electrode 360 through the drain 348a and the connection line 370.

Figure 6:
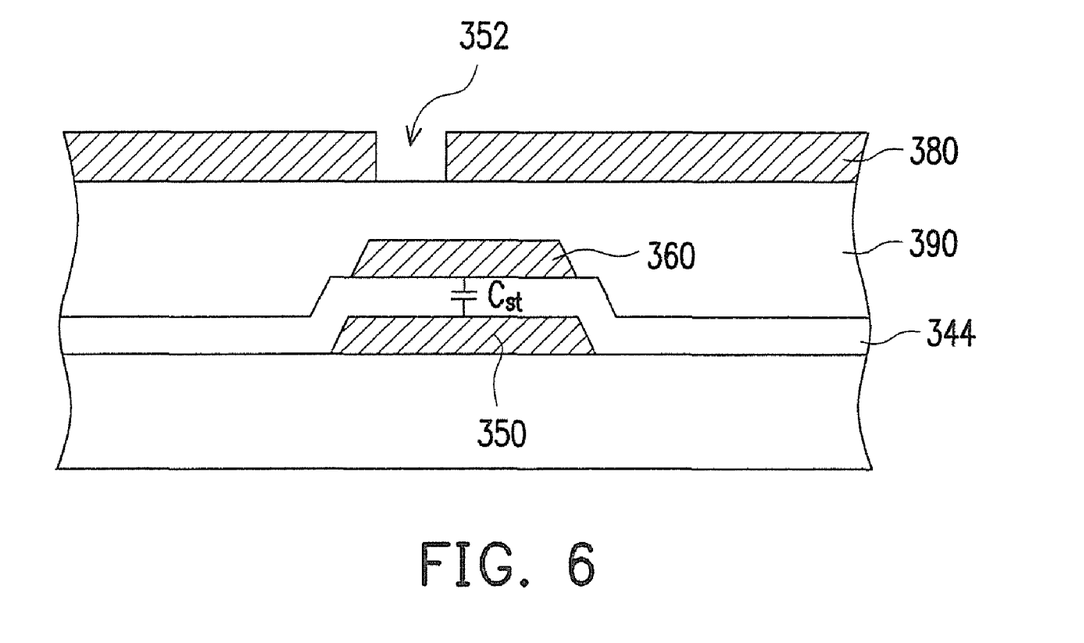
FIG. 6 is a cross sectional view showing a storage capacitor according to an embodiment of the present invention.

FIG. 6 is a cross sectional view showing a storage capacitor according to an embodiment of the present invention. Referring to FIG. 6, the storage capacitor comprises a common line 350, a gate insulation layer 344, a top electrode 360, a protection layer 390, a pixel electrode 380, and a repair area 352. Wherein, the gate insulation layer 344 is disposed over the common line 350. The top electrode 360 is disposed over the gate insulation layer 344. The protection layer 390 covers the top electrode 360 and the gate insulation layer 344. The pixel electrode 380 is disposed over the protection layer 390. A repair area 352 is in the pixel electrode 380.

Referring to FIG. 6, the common line 350, the gate insulation layer 344 and the top electrode 360 form an MIM storage capacitor. Wherein, the common line 350 and the top electrode 360 constitute a storage capacitor. However, the top electrode 360 and the pixel electrode 380 do not constitute a storage capacitor. The reason is that the pixel electrode 380 is electrically connected to the top electrode 360 through the drain 348a and the connection line 370.

Figure 7:
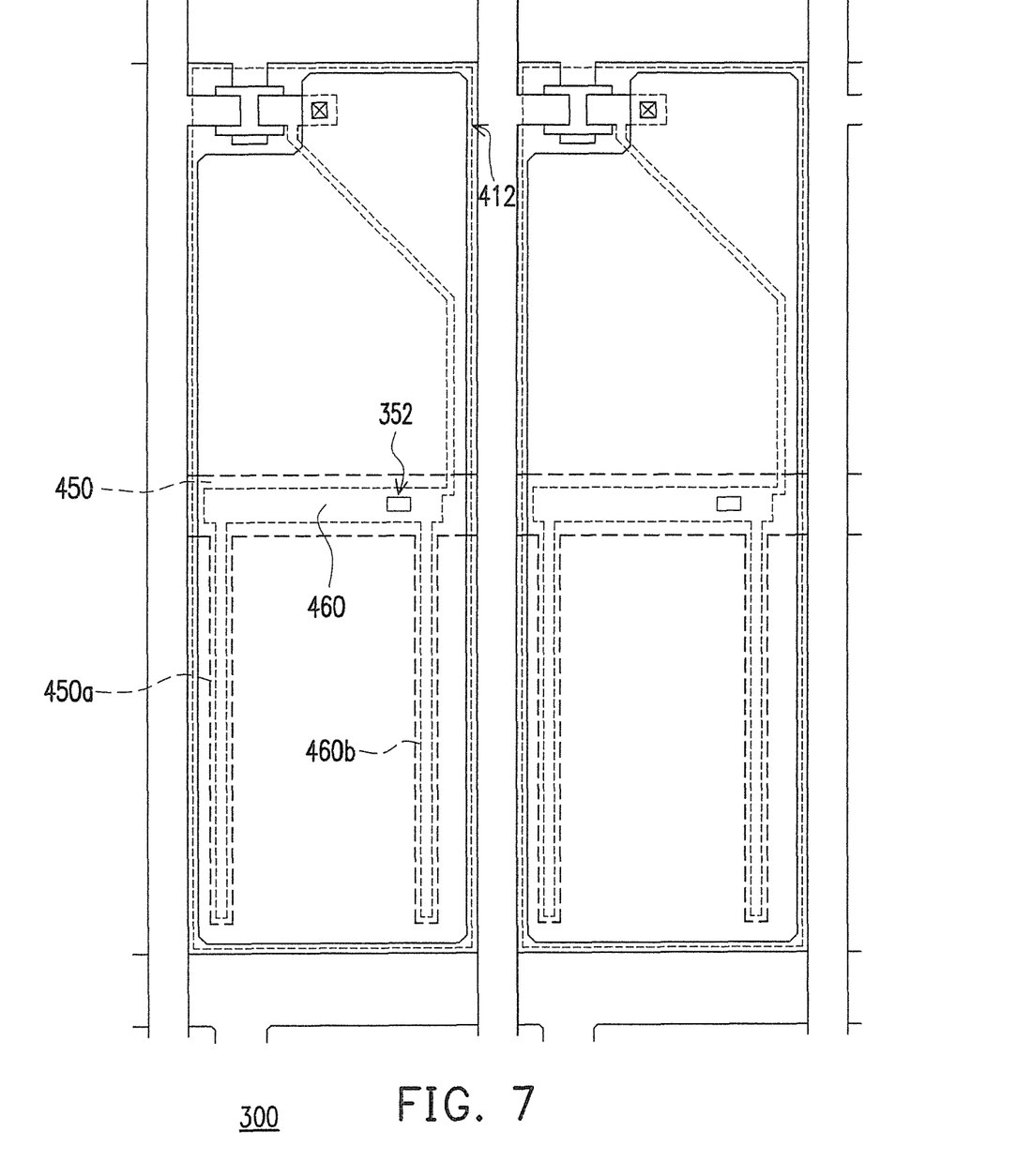
FIG. 7 is a top view showing a thin film transistor array substrate according to another embodiment of the present invention.

In addition, the capacitance Cst of the storage capacitor can be increased by special structures of the capacitor. FIG. 7 is a top view showing a thin film transistor array substrate according to another embodiment of the present invention. Referring to FIG. 7, the common line 450 comprises a plurality of first branch structures 450a, and the top electrode 460 comprises a plurality of the second branch structures 460a. Each of the second branch structures 460a is covering each of the first branch structures 450a correspondingly. Note that the first branch structures 450a and the second branch structures 460a are disposed in the disclination area of the pixel area 412. It means the first branch structures 450a and the second branch structures 460a are disposed near the two sides of the pixel area 412 to reduce light penetration.

In other words, the present invention provides a pixel structure with a storage capacitor. The pixel structure comprises a thin film transistor 340, a pixel electrode 380, a common line 350, a top electrode 360 and a connection line 370. Wherein, the thin film transistor 340 comprises a gate 342, a source 348b, and a drain 348a. The drain 348a of the thin film transistor 340 is electrically connected to the pixel electrode 380, for example. The material of the gate 342 can be, for example, aluminum or other metal. In another preferred embodiment, the gate insulation layer 344 is disposed over the gate 342. The material of the gate insulation layer 344 can be, for example, silicon nitride, silicon oxide, or other dielectric materials. The material of the source 348b and the drain 348a can be, for example, a Mo/Al/Mo composite material, a suitable signal metal material, or other suitable composite metal material. The common line 350 is disposed under the pixel electrode 380.

The top electrode 360 is disposed between the common line 350 and the pixel electrode 380. The top electrode 360 and the common line 350 constitute a storage capacitor. However, the top electrode 360 and the pixel electrode 380 do not constitute a storage capacitor. The reason is that the pixel electrode 380 is electrically connected to the top electrode 360 through or the drain 348a and the connection line 370.

As described, the present invention provides a pixel structure and a thin film transistor array. With the structures described above, the present invention provides a method for repairing the bright/dark spots which are resulted from damage of the storage capacitor of the MIM structure. Following are descriptions of the repairing method.

Figure 8:
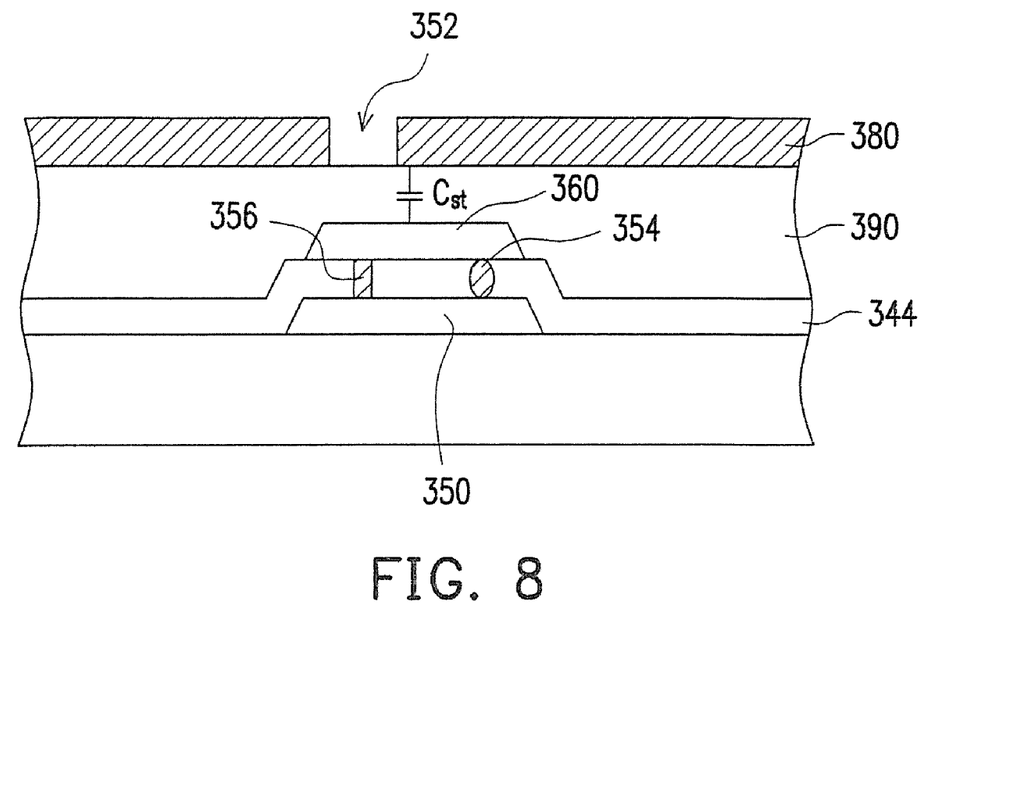
FIG. 8 is a cross sectional view showing a thin film transistor with a defect according to an embodiment of the present invention.

FIG. 8 is a cross sectional view showing a thin film transistor with a defect according to an embodiment of the present invention. Referring to FIG. 8, when charge leakage of the MIM storage capacitor occurs due to a particle 354 or holes (not shown), the present invention cuts the portion 372 of the connection line 370 as shown in FIGS. 3A-3B, which is not covered by the pixel electrode. The method to cut the potion 372 of the connection line 370 can be a laser fusion, for example. Then, the laser welds the top electrode 360 and the common line 350. As a result, the electrical connection between the top electrode 360 and the pixel electrode 380 is cut. The top electrode 360, the protection layer 390, and the pixel electrode 380 form the MII storage capacitor to replace the damaged MIM storage capacitor.

Referring to FIG. 8, the present invention welds the top electrode 350 and the common line 350 to generate a conductive channel 356 through the repair area 352. The top electrode 350 is thus electrically connected to the common line 350. Accordingly, the MIM storage capacitor does not exist anymore. The operation voltage can be controlled by the MIM storage capacitor to reduce complexity of operation.

Figure 9:
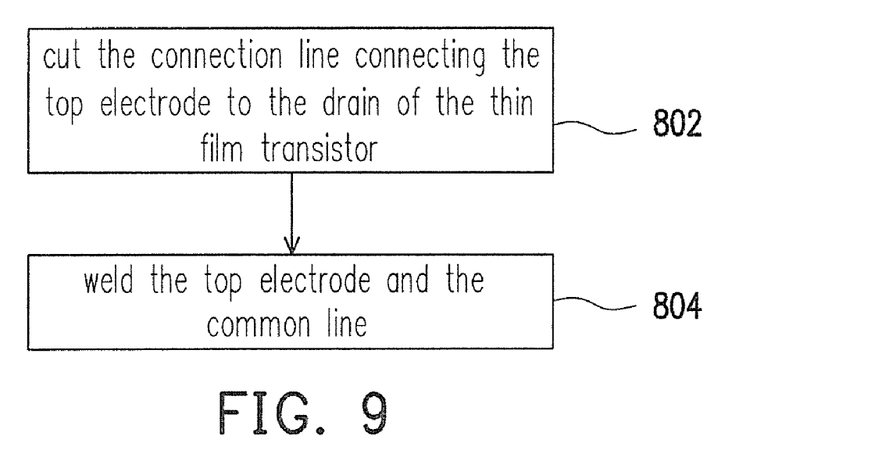
FIG. 9 is a flowchart showing a method for repairing a thin film transistor array according to an embodiment of the present invention.

In most situations, to secure the operation voltage for devices is under requirement, the following repairing method is proposed when storage capacitors are in defect. FIG. 9 is a flowchart showing a repairing method for a thin film transistor array according to an embodiment of the present invention. Referring to FIG. 8, the connection line 372 connecting the top electrode 360 and the drain 348a of the thin film transistor is cut (Step 802). Then, the top electrode 360 and the common line 350 are welded (Step 804). Accordingly, the instability of the capacitance Cst of the damaged storage capacitor can be avoided, hence the device quality issue can also be eliminated.

In the embodiments described above, the definition of the drain is the electrical connection point of the thin film transistor and the pixel electrode. The definition of the source is the electrical connection point of the thin film transistor and the data line. However, one of ordinary skill in the art, under different conditions, may properly adjust the definitions of the source and the drain.

Accordingly, the thin film transistor array and the repairing method therefor of the present invention comprise at least the following advantages.

1. In the thin film transistor array of the present invention, the connection line electrically connects the top electrode and the drain of the thin film transistor, which converts a storage capacitor structure while repairing the capacitor.

2. In the thin film transistor array of the present invention, the common line and the top electrode comprise the first branch structure and the second branch structure, respectively, to increase the capacitance Cst of the storage capacitor.

3. The thin film transistor array of the present invention comprises a portion of the connection line, which is not covered by the pixel electrode, and the overlapping area of the common line and the top electrode, which is not covered by the pixel electrode. The undesired electrical connection during the repairing process can be avoided.

4. The method for repairing a thin film transistor array of the present invention can effectively resolve the charge leakage issue resulting from the defect in the storage capacitor, and thus improve the yield of the thin film transistor array.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method for repairing a thin film transistor array, wherein the thin film transistor array comprising:
   a substrate;
   a plurality of scan lines disposed over the substrate;
   a plurality of data lines disposed over the substrate, wherein the scan lines and the data lines defining a plurality of pixel areas on the substrate;
   a plurality of thin film transistors, each of the thin film transistors being disposed in one of the pixel areas, wherein the thin film transistors are driven through the scan lines and the data lines, and each of the thin film transistors comprises a gate, a source and a drain;
   a plurality of common lines disposed over the substrate, each of the common lines being disposed between two adjacent scan lines;
   a plurality of top electrodes, each of the top electrodes being disposed in one of the pixel areas over one of the common lines, thereby forming a storage capacitor;
   a plurality of connection lines, each of the connection lines electrically connected to the drain of each thin film transistor and one of the top electrodes, respectively; and
   a plurality of pixel electrodes, each of the pixel electrodes being disposed in one of the pixel areas over one of the top electrodes and one of the connection lines, wherein the drain of each thin film transistor is electrically connected to one of the pixel electrodes, a portion of each connection line is not covered by the pixel electrode, each of the top electrodes and the corresponding common line have an overlapping area, and the overlapping area has a repair area not covered by the pixel electrode, and the method for repairing the thin film transistor array comprising:
   locating the pixel area having the storage capacitor to be repaired;
   cutting the connection line where it is not covered by the pixel electrode in the corresponding pixel area; and
   welding the top electrode and the common line in the corresponding repair area.

2. A method for repairing a thin film transistor array, wherein the thin film transistor array comprising:
   a substrate;
   a plurality of scan lines disposed over the substrate;

a plurality of data lines disposed over the substrate, wherein the scan lines and the data lines defining a plurality of pixel areas on the substrate;

a plurality of thin film transistors, each of the thin film transistors being disposed in one of the pixel areas, wherein the thin film transistors are driven through the scan lines and the data lines, and each of the thin film transistors comprises a gate, a source and a drain;

a plurality of common lines disposed over the substrate, each of the common lines being disposed between two adjacent scan lines;

a plurality of top electrodes, each of the top electrodes being disposed in one of the pixel areas over one of the common lines, thereby forming a storage capacitor;

a plurality of connection lines, each of the connection lines disposed between and electrically connected to the drain of each thin film transistor and one of the top electrodes, respectively, each of the connection lines has a first portion and a second portion, wherein each first portion is connected between the drain of each thin film transistor and one of the second portions, and the drains of the thin film transistors and the second portions are separated by the first portions; and a plurality of pixel electrodes, each of the pixel electrodes being disposed in one of the pixel areas over one of the top electrodes and one of the connection lines, wherein the drain of each thin film transistor is electrically connected to one of the pixel electrodes without the connection lines therebetween, the first portion of each connection line is not overlapped by the pixel electrode, each of the top electrodes and the corresponding common line have an overlapping area, the overlapping area has a repair area not covered by the pixel electrode, and the method for repairing the thin film transistor array comprising:

locating the pixel area having the storage capacitor to be repaired;

cutting the connection line where it is not overlapped by the pixel electrode in the corresponding pixel area; and welding the top electrode and the common line in the corresponding repair area.

* * * * *